Patented Nov. 1, 1927.

1,647,662

UNITED STATES PATENT OFFICE.

JOHANNES PFLEGER, OF FRANKFORT-ON-THE-MAIN, AND AUGUST ALBERT, OF MUNICH, GERMANY.

PROCESS FOR THE MANUFACTURE OF ORGANIC ARSENIC COMPOUNDS.

No Drawing. Application filed November 29, 1924, Serial No. 752 947, and in Austria December 4, 1923.

Derivatives of organic arsenic compounds have been prepared by causing hydrazine derivatives to react upon aliphatic cyclical arsenic compounds such as contain carbonyl groups in non-cyclical linkage, susceptible of reaction. Hereby condensation products are obtained which contain the arsenic in the same form of linkage and in the same degree of oxidation as the arsenic compound employed as originating substance. If, therefore, one starts for example from an arsinic acid, the condensation product with the hydrazine component is also an arsinic acid. If, on the other hand, one starts from an arsine oxide or from an arseno benzene, on condensation with hydrazine compounds the derivative of the arsine oxide or the arseno benzene respectively are produced.

According to our present invention new arsenic compounds of great therapeutical value are produced by causing carbonyl arsenic compounds of the above mentioned character such as for example arsinic acids, arsine oxides or arseno benzenes to react with nitrogen hydrogen compounds containing reactive amino groups linked to carbon or oxygen and thus do not belong to the hydrazine series. As such reactive amino derivatives in the sense of our invention for instance bases of the type $RNH_2$ come into consideration, R may mean here any aliphatic or aromatic carbocyclical or heterocyclical or hydrogenated compound, either unsubstituted or substituted in some way; furthermore, for instance hydroxylamine and its derivatives, amino sulphonic acids, amino carboxylic acids, amino aldehydes and amino ketones, also for example acid amides, urea and its derivatives etc.

The process may be executed in solutions having an acid, alkaline or neutral reaction.

By way of illustrating the method as to how our invention should be carried out in practice we give the following examples:

1. 5 grms. of p-acetophenone arsinic acid are dissolved in 40 cc. of about one half normal caustic soda solution and 3 grms. of hydroxylamine hydrochloride are added, no reduction of the arsinic acid being caused thereby. After heating the mixture for a short time on the water bath it is allowed to cool, whereupon the crystalline colourless oxime separates. In order to purify the oxime it is re-crystallized from five times its weight of water. On cooling colourless large plates separate. After drying by exposure to air it decomposes at 157° C. The following is a structural representation of the resulting compound:

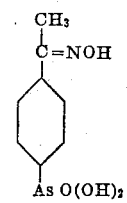

2. 5.2 grms. of p-acetophenone arsinic acid are well triturated in a mortar with 2.4 grms. of urea and heated afterwards to about 130° C. for one hour. The melt, oily at the start solidifies into a crystalline magma. For purification purposes the product is dissolved in a small quantity of water, after filtration the clear solution is acidulated, whereupon the arsinic acid settles in a crystalline state. The arsinic acid has no melting point but changes colour on heating in a capillary tube to 220° C. into brown and then black. The following is a structural representation of the resulting compound:

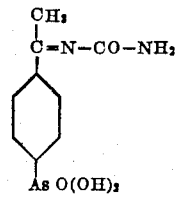

3. 2.6 grms. of p-acetophenone arsinic acid are thoroughly triturated with 1.5 grms. of glycocolle and then heated to 130° C. for one hour. A liquid results which gradually solidifies. The reaction product may be recrystallized from water or alcohol. The arsinic acid decomposes according to the various ways of heating at about 220° C. The following is a structural representation of the resulting compound:

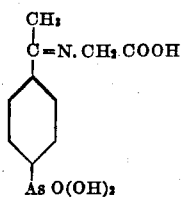

4. 2.6 grms. of p-acetophenone arsinic acid and 1.4 grms. of p-amido acetophenone are ground together and heated to about 170° C. in an oil bath during about two hours under agitation. The reddish liquid solidifies. It is then digested with approximately 20 cc. of boiling water, filtered hot by suction from the deposit, the latter being washed with hot water. The remaining product is dried on a clay plate. It is soluble in ammonia and caustic alkali solution, shows the well known magnesia reaction of the arsinic acids even in the cold in contradistinction to the originating substance. It does not fuse even up to 280° C.

5. 2.6 grms. of p-acetophenone arsinic acid and 1.5 grms. or o-aminobenzaldehyde are well mixed and heated for one hour to about 145° C. The liquid deposits solid parts after some time and solidifies completely after an hour. The reaction product is extracted with 20 cc. of boiling water being quite insoluble therein, and dried on a clay plate. It is soluble in ammonia and caustic soda solution and shows the magnesia reaction in the cold. The light yellow condensation product does not fuse even up to 280° C. and merely becomes darker at higher temperatures.

6. 2.6 grms. of p-acetophenone arsinic acid and 1.5 grms. of o-aminobenzoic acid are ground together and heated in an oil bath at about 165° C. for one to one and a half hour. At first a liquid dark red melt results, which gradually congeals. It is boiled out with water, the remaining solid mass is well washed with hot water and dried on a clay plate. The brownish substance is soluble in caustic soda solution and ammonia, and gives the magnesia reaction even in the cold. It is insoluble in most of the organic solvents and does not melt up to 280° C.

7. 2.6 grms. of 1-hydroxy-2-acetophenone-4-arsinic acid are finely pulverized and ground with 3 grms. p-phenetidine. The mixture becomes warm from its heat of reaction and forms a semisolid mass which is heated for another quarter of an hour at about 136° C. to complete the reaction. The light brown solid mass is crystallized at once from about 100 cc. of alcohol whereby it separates in long plates pointed at their ends. About 3.7 grms. of the condensation product are obtained. The fusion point is 169° C. It is soluble in ammonia and caustic soda.

8. A hot solution of 1.7 grms. of α-benzyl-hydroxylamine hydrochloride in about 20 cc. of alcohol is added to a hot solution of 2.3 grms. of p-benzaldehyde arsinic acid in 10 cc. of alcohol. The solution is boiled for about 8 hours on a water bath. On cooling the condensation product separates out in white shining leaflets. It can be recrystallized from alcohol. It does not fuse up to 280° C. The following is a structural representation of the resulting compound:

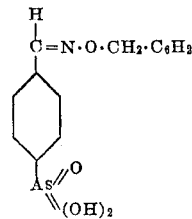

9. 1.15 grms. of p-benzaldehyde arsinic acid and 0.9 grm. of sulphanilic acid are heated in a pressure tube with 10 cc. of alcohol at about 160° C. during 20 hours. The condensation product is a brown tough mass, which is extracted with 10 cc. of boiling water. The remaining brownish separation is dried on a clay plate and does not melt even at 280° C. The product is easily soluble in ammonia and shows the magnesia reaction in the cold.

10. A hot solution of 2.3 grms. of arsanilic acid in 20 cc. of methanol is added to a hot solution of 2.3 grms. p-benzaldehyde arsinic acid in 15 cc. of methanol. The clear solution is kept on the water bath for about 9 hours, whereupon the main part of the methylalcohol is distilled off. The crystalline residue is recrystallized several times from water wherefrom it crystallizes into compact pointed plates. The colourless condensation product does not melt up to 280° C., but merely grows darker at a temperature of about 200° C. The following is a structural representation of the resulting compound:

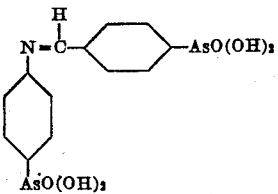

11. A solution of 0.5 cc. of aniline in 3 cc. of alcohol is added to a hot solution of 1.15 grms. of p-benzaldehyde arsinic acid in about 7 cc. of alcohol. Soon the light yellow crystalline aniline salt of the arsinic acid separates, which is then heated in a pressure tube at 100° C. during 8 hours. The condensation product is dried on a clay plate. It is a faintly yellow coloured substance, which is easily soluble in ammonia solution and shows the magnesia reaction in the cold. It does not fuse up to 280° C. from 200° C. onwards only it becomes darker.

12. A hot solution of 2.4 grms. of amino-antipyrine in 10 cc. of alcohol is added to a hot solution of 2.3 grms. of p-benzaldehyde arsinic acid. The solution clear at the beginning yields on the water bath very quickly a crystalline deposit, filling the whole receptacle after prolonged warming.

After heating for about one and a half hours the mass is allowed to cool and the crystalline deposit is aspirated. The dry product fuses at 228° C. with decomposition. It can be crystallized from alcohol containing water. The reaction of the two components takes place not only in alcoholic but also in ammoniacal solution.

13. 1.15 grms. of p-benzaldehyde arsinic acid are intimately mixed with 0.35 grm. of acetamide and the mixture is heated for one hour to about 130° C. The melt is dissolved in a small quantity of water and the colourless condensation product is precipitated from the clear solution. The aspirated dry product can be purified by dissolving it in a small quantity of dilute hydrochloric acid. From the filtered clear solution it is precipitated by carefully adding ammonia solution. The condensation product is very easily soluble in an excess of ammonia solution; also in acids. It does not melt up to 280° C. but it disappears gradually at temperatures above 240° C. whilst getting brown.

14. 0.15 cc. of p-phenetidine is poured over 0.2 grm. of benzaldehyde arsenobenzene. On stirring well, the mass becomes warm from its heat of reaction. After thoroughly agitating for a time excluding the air as far as possible the reaction mass is triturated with about 2 cc. of alcohol, drawn off and washed with alcohol. After drying in vacuo the condensation product does not fuse when heated in capillary tube up to 280° C. The following is a structural representation of the resulting compound:

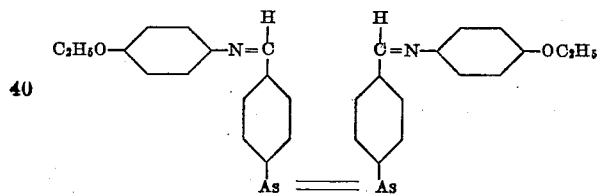

15. An alkaline solution of about 0.3 grm. of hydroxylamine hydrochloride is added to a warm alkaline solution of 0.6 grm. of p-benzaldehyde arsine oxide in about 4–6 cc. of normal caustic soda solution. A strong white precipitate is formed at once which goes into solution on warming on a water bath. After heating for half an hour the mixture is allowed to cool and the condensation product of the arsine oxid is filtered by suction. Additional quantities of the oxide can be obtained on acidification of the mother liquer. It dissolves in caustic soda forming a clear solution and can be precipitated by means of ammonium chloride solution in a pure, quite colourless state. It decomposes with foaming at about 270° C.

16. A warm solution of 0.3 grm. of α-benzylhydroxylamine hydrochloride in about 10 cc. of water is added to a warm solution of 1.3 grms. of 3-nitro-1-benzaldehyde-4-arsinic acid in about 10 cc. of water. A precipitate is formed immediately. The reaction product is kept on the water bath for some time to complete the reaction. The product after being aspirated and dried, can be recrystallized from glacial acetic acid, wherefrom it crystallizes on in plates pointed at both ends. It fuses at 220° C.

17. 4.6 grms. of p-benzaldehyde arsinic acid and 4 grms. of urethane are ground and mixed intimately and heated for about 3 hours on a water bath. On cooling a solid faintly yellow coloured mass results which can be recrystallized directly from about 12 cc. of ethylalcohol. When getting cool the whole mass solidifies into a crystalline magma of long pointed needles. After aspirating and drying on clay plates about 4 grms. are obtained. On heating in a capillary tube the product grows slowly yellow from 200° C. onwards and is fused into a brownish mass at 275–280° C. The following is a structural representation of the resulting compound:

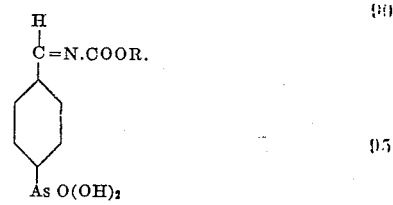

What we claim is:

1. A process for the manufacture of new organic arsenic compounds which consists in causing arsenic compounds containing carbonyl groups in non-cyclical linkage to react with nitrogen hydrogen compounds containing the grouping $NH_2$ —a— wherein a is carbon or oxygen and the amino hydrogens are reactive with carbonyl groups.

2. A process for the manufacture of new organic arsenic compounds, which consists in causing arsenic compounds of the general formula $$x-\underset{\underset{O}{\|}}{C}-y-As-z$$

wherein $x$ stands for hydrogen or any hydrocarbon residue, $y$ for an aryl, substituted or not, As for the arsenic atom in its trivalent or pentavalent state, $z$ for oxygen, or the $\equiv O(OH)_2$ group or an =As-aryl group, the aryl residue of the latter group being substituted or not to react with nitrogen hydrogen compounds containing the grouping $NH_2$ —a— wherein a is carbon or oxygen and the amino hydrogens are reactive with carbonyl groups.

3. A process for the manufacture of new organic arsenic compounds, which consists in causing arsenic compounds of the general formula:

wherein $x$ stands for hydrogen or any hydrocarbon residue, $y$ for an aryl, substituted or not to react with nitrogen hydrogen compounds containing the grouping $NH_2$ —$a$— wherein $a$ is carbon or oxygen and the amino hydrogens are reactive with carbonyl groups.

4. A process for the manufacture of new organic arsenic compounds, which consists in causing para-benzaldehyde arsinic acid of the following formula

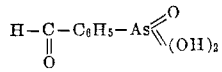

to react with nitrogen hydrogen compounds containing the grouping $NH_2$ —$a$— wherein $a$ is carbon or oxygen and the amino hydrogens are reactive with carbonyl groups.

5. As new products compounds which are substantially identical with the organic arsenic compounds obtainable by condensing an organic compound of the general formula

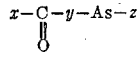

wherein $x$ stands for the hydrogen or any hydrocarbon residue, $y$ for an aryl, substituted or not, As for the arsenic atom in its trivalent or pentavalent state, $z$ for oxygen, the $\equiv O(OH)_2$ group or an $=As$-aryl group, the aryl residue of the latter group being substituted or not with an amino compound containing the grouping $NH_2$ —$a$— wherein $a$ is carbon or oxygen and the amino hydrogens are reactive with carbonyl groups, the compounds being linked to each other by a $C=N$ bond.

6. As new products compounds which are substantially identical with the organic arsenic compounds obtainable by condensing para-benzaldehyde arsinic acid of the following formula

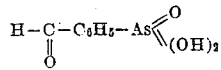

with an amino compound containing the grouping $NH_2$ —$a$— wherein $a$ is carbon or oxygen and the amino hydrogens are reactive with carbonyl groups, the compounds being linked to each other by a $C=N$ bond.

7. As new products compounds which are substantially identical with the organic arsenic compound obtainable by condensing para-benzaldehyde arsinic acid of the following formula

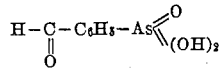

with amino-antipyrine.

Signed at Frankfort-on-the-Main, Germany, in the country of Germany, this 11th day of November A. D. 1924.

JOHANNES PFLEGER.
AUGUST ALBERT.